United States Patent
Svortdal et al.

(10) Patent No.: US 10,154,241 B2
(45) Date of Patent: Dec. 11, 2018

(54) DEPTH MAP BASED PERSPECTIVE CORRECTION IN DIGITAL PHOTOS

(71) Applicant: Polight AS, Horten (NO)

(72) Inventors: Tore Svortdal, Horten (NO); Pierre Craen, Embourg (BE); Nicolas Tallaron, Lyons (FR); Jacques Dumarest, Notre Dame de Mésage (FR)

(73) Assignee: Polight AS, Horten (NO)

( * ) Notice: Subject to any disclaimer, the term of this patent is extended or adjusted under 35 U.S.C. 154(b) by 88 days.

(21) Appl. No.: 15/508,390

(22) PCT Filed: Sep. 4, 2015

(86) PCT No.: PCT/EP2015/070246
§ 371 (c)(1),
(2) Date: Mar. 2, 2017

(87) PCT Pub. No.: WO2016/034709
PCT Pub. Date: Mar. 10, 2016

(65) Prior Publication Data
US 2017/0289516 A1    Oct. 5, 2017

(30) Foreign Application Priority Data

Sep. 5, 2014    (EP) .................................... 14183766

(51) Int. Cl.
*H04N 13/128* (2018.01)
*G06T 3/00* (2006.01)
(Continued)

(52) U.S. Cl.
CPC ............ *H04N 13/128* (2018.05); *G06T 3/00* (2013.01); *G06T 5/006* (2013.01); *H04N 13/122* (2018.05);
(Continued)

(58) Field of Classification Search
CPC ...... H04N 13/128; H04N 13/122; G06T 3/00; G06T 5/006
See application file for complete search history.

(56) References Cited

U.S. PATENT DOCUMENTS

2015/0091900 A1* 4/2015 Yang ..................... G06T 5/006
345/419

FOREIGN PATENT DOCUMENTS

| JP | 2012-10044 A | 1/2012 |
| WO | WO 2015/048694 A2 | 4/2015 |

OTHER PUBLICATIONS

Battiato, S. et al., "3D Stereoscope Image Pairs by Depth-Map Generation" 3D Data processing, Visualization and Transmission, $2^{nd}$ International Symposium on Thessaloniki, Sep. 6-9, 2004.
(Continued)

*Primary Examiner* — Hunter B Lonsberry
(74) *Attorney, Agent, or Firm* — Knobbe Martens Olson & Bear LLP

(57) ABSTRACT

The invention relates to post-processing of a digital photo to correct perspective distortion in the photo. The correction applies a digital photo of a scene and a depth map associated with the photo and comprising, for each pixel in the photo, a depth being a distance between a part of the scene in that pixel and a position of the camera at the time of acquisition. The correction is performed locally, so that the correction of any pixel in the photo depends on the depth of that pixel. The correction can be implemented as a transformation of each pixel in the original photo into a new position in a corrected photo. Afterwards, pixel values has to be calculated for the pixels in the corrected photo using the original pixel values and their new positions. The invention is particularly relevant for photos where objects or scenes involves a large magnification variation, such as selfies, close up photos, and
(Continued)

photos when the extension of a large, object is not orthogonal to the optical axis of the camera (low/high angle shots).

12 Claims, 4 Drawing Sheets

(51) Int. Cl.
  *G06T 5/00* (2006.01)
  *H04N 13/122* (2018.01)
(52) U.S. Cl.
  CPC .............. *G06T 2207/10028* (2013.01); *H04N 2213/003* (2013.01)

(56) References Cited

OTHER PUBLICATIONS

Nielsen, Morten Ødegaard "True Orthophoto generation" IMM Thesis 2004-50, Kgs. Lyngby 2004.

Qin, Zhihao et al., "A Methodology for True Orthorectification of Large-Scale Urban Aerial Images and Automatic Detection of Building Occlusions Using Digital Surface Model" Learning from Earth's Shapes and Sizes: IEEE International Geoscience and Remote Symposium, France, Jul. 21-25, 2003, pp. 729-731, vol. 2.
Sharma, Mansi et al., "Parameterized Variety Based View Synthesis Scheme for Multi-view 3DTV" Computer Vision ACCV, Springer Berlin, Nov. 5, 2012 pp. 538-551, XP047027210.
Sharma, Mansi "Kinect-Variety Fusion: A Novel Hybrid Approach for Artifacts-free 3DTV Content Generation" International Conference on Pattern Recognition, IEEE Computer Society, Aug. 24, 2014, pp. 2275-2280, XP032698211.
Venkataraman, Kartik et al., "PiCam: An Ultra-Thin High Performance Monolithic Camera Array" ACM Transactions on Graphics, Nov. 2013, pp. 1-13, vol. 32, No. 6, Article 166, XP058033885.
DxO ViewPoint 2 (http://www.dxo.com/intl/photography/dxo-viewpoint/wide-angle-lens-software).
International Search Report for PCT/EP2015/070246 dated Nov. 27, 2015.

* cited by examiner

DEPTH MAP BASED PERSPECTIVE CORRECTION IN DIGITAL PHOTOS

CROSS REFERENCE TO RELATED APPLICATIONS

This application is a U.S. National Phase Application of PCT International Application Number PCT/EP2015/070246, filed on Sep. 4, 2015, designating the United States of America and published in the English language, which is an International Application of and claims the benefit of priority to European Patent Application No. 14183766.6, filed on Sep. 5, 2014. The disclosures of the above-referenced applications are hereby expressly incorporated by reference in their entireties.

FIELD OF THE INVENTION

The invention relates to post-processing of digital photos, more specifically to a method, digital storage holding software, an integrated circuit, and a handheld device with a camera for performing post processing of digital photos.

BACKGROUND OF THE INVENTION

Perspective Distortion

Photography provides a 2D representation of the 3D world. This 3D to 2D transformation is achieved via projection of the 3D scene on a 2D sensor using a lens.

At large distance and if camera optical axe is perpendicular to the extension of an object, the perspective projection provides a pleasant picture "in line with human expectation". But, if there is a significant ratio between the distances to the closest parts and the furthest parts of the object, parts at close distance will appear at different magnification than parts at larger distance and this magnification variation causes a perspective distortion in the photo of the object.

There are a number of commonly known perspective distortion effects. When the extension of a large, object is not orthogonal to the optical axis, parallel lines in the object are not parallel on the photo since the closest end is magnified more than the distant end. This is for example the case when a skyscraper is photographed from a low angle. Another often encountered effect is when the distance between camera and object in the photo is in the same order of magnitude as the depth of the topology of the object; close parts appear out of proportion with distant parts. This is for example the situation in selfies (self-portraits taken by cameras held in the hand of the subject) where the arms-length distance (30 to 50 cm) between the camera and the head of the subject is about the same distance order of magnitude as the distance between the nose and the ears, so that the nose appears unnaturally large.

Thus, perspective distortion can affect any photo where objects or scenes involves a large magnification variation.

Perspective Correction

The perspective correction problem has been partially solved in some specific use cases, most of the time with tools requiring user interaction. Current tools allows to correct low and high-angle shot photos, but these corrections are global corrections based either on the knowledge of the camera position and orientation, or on an assumed geometry of the scene (e.g. parallel lines in a building).

Most of the currently available correction solutions only provides correction of optical distortion introduced by camera optics, such as fish-eye, barrel, or pincushion correction. In these cases, the optical distortion is modelled and a global correction is applied.

DxO ViewPoint 2 (http://www.dxo.com/intl/photography/dxo-viewpoint/wide-angle-lens-software) represents the current state of the art within perspective distortion correction. The DxO ViewPoint application allows correction of perspective distortion introduced by the camera optics when a wide-angle lens is used. It also allows correction of vanishing lines by performing a different projection, but the correction is independent of the distance between the camera and the object(s) or scene, and cannot simultaneously correct close and large distance deformations. The applied correction is global and is applied independently of the topology of the scene or object in the photo.

Global corrections are based on smooth canonical function defined by a small number of parameters, on camera extrinsic and intrinsic parameters, and/or on "a priori" or user defined data. As an example, FIGS. 1A-D illustrates image corrections made by DxO ViewPoint with the same correction applied on a photo and a checkerboard pattern. FIG. 1A shows the original photo and pattern; in 1B a lens distortion correction is applied; in 1C perspective correction (natural mode) is applied; and in 1D perspective correction (complete mode) is applied. The problem with global corrections such as those in DxO ViewPoint is that they are applied over the entirety of the image, independently of the subject. The correction can be tuned through user interaction to a given object in a given plane at a given location, but if the scene contains several objects at different distances from the camera, the correction cannot be good for all of them.

There are a number of smartphone applications such as SkinneePix and Facetune that allows you to improve the appearance of selfies. SkinneePix performs a simple geometric warping of the photo and is dependent on the photo containing only one face which is centered in the photo, i.e. implying a known geometry. Facetune allows local changes in shape, but it is essentially a simplified Photoshop tool specialized to photos of faces, where the user can control a local warping. It is not a perspective correction tool and does not rely on photo depth information.

There exist software for creating 3D models from multiple cameras (e.g. RGB+TOF camera, stereo camera, or projected light systems such as Microsoft Kinect). Another example is the paper "Kinect-Variety Fusion: A Novel Hybrid Approach for Artifacts-free 3DTV Content Generation" by Sharma Mansi et al describes a way to extract depth information using fusion of multiple sensors and improve depth map extraction using the Microsoft Kinect camera and projected light structure technology. The second part of the paper relates to 3DTV content generation where new views of a scene are generated using multiple images of a scene captured by cameras as they move in relation to the scene (p. 2277, Section B). These stereo vision techniques do not provide a way to automatically correct perspective distortion in a single photo. Neither do 3D GFX libraries such as OpenGL provide a way to perform perspective correction using depth information.

As of today, the available tools for perspective corrections are either global corrections implying a certain geometry of the object (straight lines, centered face), recording situation (low-angle, close up), or local corrections requiring the user's interaction and his/hers knowledge of the natural or a desired appearance of the scene or object (typically referred to as photoshopping).

SUMMARY OF THE INVENTION

It is an object of the invention to provide a method, digital storage holding software, an integrated circuit, and a handheld device with a camera for performing perspective correction by using depth information of the photo to cancel out or compensate local magnification variations throughout the photo. It is another object to perform such perspective corrections automatically without requiring a priori knowledge or user input relating to the natural appearance or topology of the scene or object(s) in the photo or the position or orientation of the camera.

In order to perform a perspective correction according to the invention, a photo alone is not enough. The distance between the camera and the scene in each pixel of the photo, a depth map, is required. Once photo plus depth map are available, with image and proper processing, it is possible to re-construct a photo that would have been taken from a virtual camera from different point of view keeping the same field of view: different angle, larger distance, and thus cancelling out or compensating any perspective distortion. Instead of using a global transformation used on the full image, local correction of each pixel is performed according to the pixels distance from the associated depth map.

Thus, in a first aspect, the invention provides a method for performing perspective correction in a digital photo of a scene recorded with a camera, the method comprising the steps of:
providing a digital photo of a scene represented by pixel values, $P_{(x,y)}$, for an array of pixels, (x,y), the photo involving perspective distortion effects;
providing a depth map associated with the photo and comprising, for each pixel in the pixel array, a depth, $d_{(x,y)}$, being a distance between a part of the scene represented by that pixel and an acquisition position of the camera at the time of acquisition of the photo; and
performing perspective correction using a photo of the scene and its associated depth map where the correction of any pixel or region in the photo depends on the depth of that pixel or depths of the pixels in that region.

In this context, a correction is to be understood as the process of changing something in order to solve a problem or produce a desired result, not being limited to a change that makes something accurate or right according to a norm. Hence, perspective corrections could also be modifications in the perspective made to achieve a certain effect in the photo. Also, the originally acquired photo or photos with perspective distortion, the original photo or source photo, is generally referred to as the acquired photo. The resulting photo in which perspective correction has been performed, the resulting photo or destination photo, is generally referred to as the processed photo. In a more detailed definition, depth is the distance from the object to the object principal plane of the camera lens. For mobile phone the object principal plane is located very close to the protective window of the camera in the he mobile phone. It should be noted that the depth map may have different (and usually lower) resolution than the photo. In such a case, the depth map may be up-scaled so they have the same resolution and for each pixel value a valid depth information is available.

It is an advantage that the perspective correction according to the invention can be performed without user interaction, so that it can be implemented as a full automatic correction providing an instantly enhanced photo. It is another advantage that the perspective correction according to the invention is local, thus correcting the local perspective distortion in each pixel or region in the photo. Thereby, the correction can simultaneously and independently correct perspective distortion in different parts with different depths in the scene of the photo.

In a preferred embodiment, the step of performing perspective correction comprises performing perspective correction of the photo of the scene using the photo and its associated depth map by for each pixel, (x,y), in the photo, determining a new position, $D_{proc}$, in an image plane for a virtual camera position from at least the pixel's depth, $d_{acq}(x,y)$, its position, $D_{acq}(x,y)$, in the image plane at the acquisition position, and a displacement, C, between the virtual camera position and the acquisition position. Preferably, the new positions are calculated to preserve the magnification in a selected plane of the depth map.

In this relation, the displacement is the difference between a final and an initial position (Translation in x, y, and z directions) and orientation (rotation around x, y, and z axes), here between the camera position at acquisition and the virtual camera position. Also, the magnification is the ratio between the real object size and the object's size in the photo, which for each pixel becomes equal to the ratio between the depth of that pixel and the effective focal length.

In an alternative formulation, the step of performing a perspective correction using at least one photo of the scene and its associated depth map preferably comprises the step of:
calculating a magnification for each pixel, (x,y), in the photo using the depth of that pixel.
calculating a new position, (x',y'), for each pixel in the photo using the calculated magnification to achieve the same magnification for all new positions.

In a further embodiment, the step of performing perspective correction comprises determining the new position as:

$$D_{proc} = \frac{D_{acq}(x, y) * d_{acq}(x, y)}{d_{acq}(x, y) + C}$$

Also, the step of performing perspective correction may further comprise adjusting a magnification of the new position using also a depth, $d_{acq\_ref}$, of a reference plane chosen to preserve a magnification in a selected plane of the depth map. This embodiment may be implemented by determining the new position as:

$$D_{proc} = \frac{D_{acq}(x, y) * d_{acq}(x, y) * (d_{acq\_ref} + C)}{(d_{acq}(x, y) + C) * d_{acq\_ref}}$$

When the new positions have been determined, the step of performing a perspective correction preferably further comprises using the pixel values $P_{(x,y)}$ and the new positions (x',y') to determine new pixel values, $P_{(i,j)}$, for an array of pixels, (i,j), representing a corrected photo by, for each new position (x',y'), add the corresponding pixel value $P_{(x,y)}$ to the new pixel values $P_{(i,j)}$ of the pixels (i,j) surrounding the new position, the pixel values $P_{(x,y)}$ being weighted by a weighting factor that is a function of the relative positions of the new position (x',y') and each pixel (i,j).

When the new pixel values has been generated by the addition of weighted values of one or more pixel values from the acquired photo, the perspective correction preferably further comprises the subsequent step of dividing each new pixel value $P_{(i,j)}$ with a normalization factor. In regions where the photo is "stretched" some new pixels may not be near any of the new positions and may thus not have any pixel values assigned to them. Therefore, the method preferably further comprises the subsequent step of, for new pixel with undefined values of $P_{(i,j)}$, calculating an interpolated pixel value from surrounding pixels in the corrected photo having defined values of $P_{(i,j)}$.

In preferred implementations, the displacement between the virtual camera position and the acquisition position is a linear displacement along an optical axis of the camera. It may also be preferred that the displacement is to a virtual camera position at infinity so that all magnification variation is equaled out.

The depth map can be generated by either a multi-camera setup or single camera setup. In a preferred embodiment the steps of providing a photo and providing a depth map associated with the photo involves only a single camera with a single acquisition position. The single camera preferably has a tunable lens or any other optical component having a tunable optical power.

The step of providing a depth map may involve generating a depth map using a focus based depth map estimation such as Depth from Focus (aka Shape from focus) or Depth from Defocus. By definition the DFF or DFD provide a depth map which is perfectly aligned with a photo taken by the same camera in the same position, and thus provides the advantage of reducing the complexity of the processing and remove any calibration between photo and depth map.

In the alternative, the steps of providing a photo and providing a depth map involves using multiple cameras, such as:
  using separate Image camera(s) and depth map camera(s);
  using a stereo or array camera to generate both image and depth map; or
  using multiple cameras and generating image and depth map from different points of view.

Since not all photos are perspective distorted to a degree where perspective correction is needed or preferred, and since perspective correction requires some processing power, it may be preferred to select photos in need of perspective correction. Thus, in a preferred embodiment, the steps of providing a photo and providing a depth map may comprise providing a series of photos and associated depth maps, and wherein the method further comprises the step of detecting and evaluating perspective distortion in the photos to select photos that would benefit from perspective correction. The evaluation of perspective distortion may for example be based either on the distance of the closest object in the scene and/or on the analysis of vanishing lines.

In a further embodiment, the same transformations used to correct perspective in the photo may be applied to transform the depth map itself in order to generate a depth map associated with the corrected photo. Here, the method of the first aspect further comprises also performing perspective correction of the depth map by, for each pixel, (x,y), in the depth map, determining a new position, $D_{proc}$, in an image plane for a virtual camera position from at least the depth held by that pixel, $d_{acq}(x,y)$, its position, $D_{acq}(x,y)$, in the image plane at the acquisition position, and a displacement, C, between the virtual camera position and the acquisition position. In this respect, the depth map is simply a single channel image (all pixel values are depths) whereas a color photo is typically a three-channel image (pixels values are in one of three color channels, e.g. RGB). The processing is equivalent, the only difference is that only the depth map itself is needed since the depth for each pixel is inherent. Preferably, the displacement C is added top each depth (pixel value) of the corrected depth map.

The perspective correction according to the first aspect of the invention may be performed immediately in the camera, or in post-processing in the camera or on another device.

The invention can be implemented by means of hardware, software, firmware or any combination of these. Thus in a second aspect, the invention provides a digital storage holding software configured to perform the method of the first aspect when executed by one or more digital processing units. The digital storage may be any one or more readable mediums capable of storing a digital code, such as discs, hard drives, RAM, ROM etc., the software can be on a single medium (e.g. memory of a device with a camera) or distributed on several media, e.g. hard drives different servers connected via a network, or others types of digital storage.

In a third aspect, the invention provides an integrated circuit configured to perform the method of the first aspect.

Similarly, in a fourth aspect, the invention provides a handheld or portable device with a camera comprising the digital storage according to the second aspect or the integrated circuit according to the third aspect.

BRIEF DESCRIPTION OF THE FIGURES

The invention will now be described in more detail with regard to the accompanying figures. The figures show one way of implementing the present invention and is not to be construed as being limiting to other possible embodiments falling within the scope of the attached claim set.

DETAILED DESCRIPTION OF THE INVENTION

The main emphasis of the examples presented in the following description is on perspective deformation when the ratio between camera distance to closest part of the scene, and furthest part of the scene is high and introducing a strong distortion. This mainly happens with close distance or low-angle shot. However, the perspective correction according to the invention can be applied for any scene topology.

The methodology of the perspective correction of the invention to transform the photo from the Point of View (POV) of the camera at the time of acquisition to a virtual POV in the processed photo where the perspective distortion effects are reduced, insignificant, or not present. It is also an objective to change to a new POV (far or infinity) while keeping the same object size.

So, for each pixel, (x,y), in the acquired photo, one need to compute a new position (x',y') of the associated pixel value $P_{(x,y)}$ in the processed photo. The new position is calculated as a function of the pixels position in the acquired photo, (x,y), and the distance, $d_{(x,y)}$, between the camera and the part of the scene in that pixel.

The following describes an embodiment where the displacement between the camera position at the time of acquisition (also referred to as the original camera position)

and the camera position at the virtual POV is a linear displacement along the optical axis of the camera, here the Z axis. More complex displacements (displacement in other directions: x/y as well as rotation) can be used, but the algebra for these are, although straightforward to derive, quite extensive.

Figure 1A:
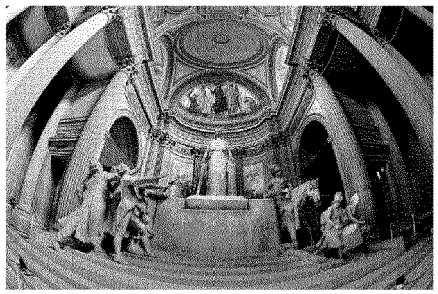
FIGS. 1A-D illustrate image corrections made by DxO ViewPoint 2 Application with the same correction applied on a photo and a checkerboard pattern.
Figure 1A:
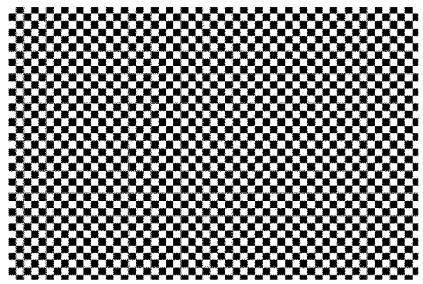
Figure 1B:
Figure 1B:
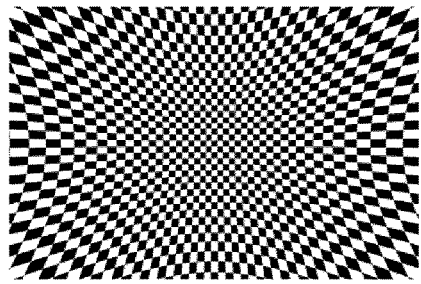
Figure 1C:
Figure 1C:
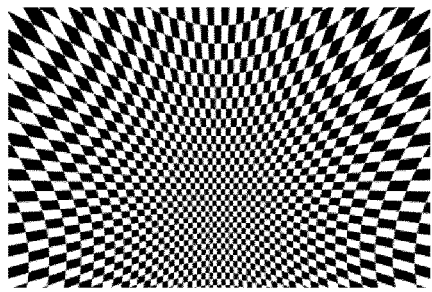
Figure 1D:
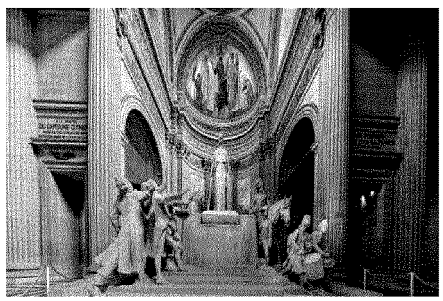
Figure 1D:
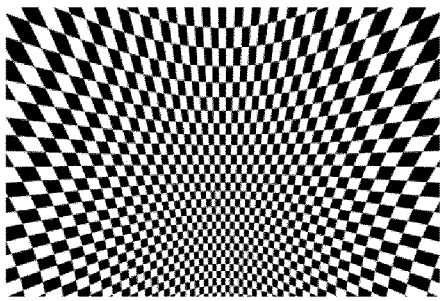
Figure 2:
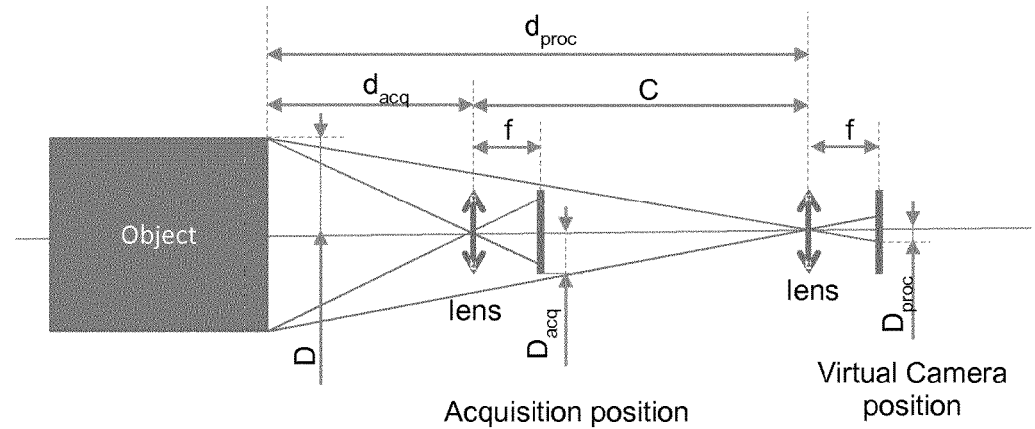
FIGS. 2 and 3 illustrate a setup for explaining the derivation of the applicable algebra according to a specific implementation of the invention.

FIG. 2 illustrates the setup with an object, an acquisition position of the camera and a virtual camera position, the camera having a lens and with a focal length f.

Figure 3:
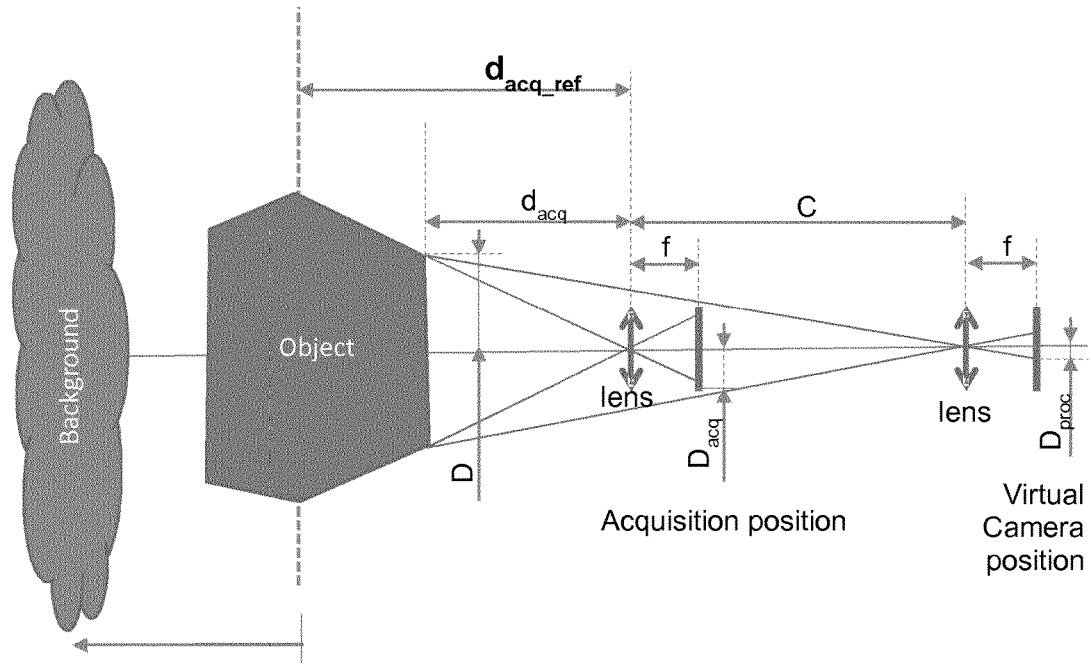

The following notation will be used in the description and are illustrated in FIGS. 2 and 3:

d: The depth for a pixel
D: A pixels distance from the center of the sensor or the optical axis
C: Displacement between the acquisition position and the virtual position along Z-axis, +: moving away from scene; −: moving closer to scene
Index "acq": referring to the acquired photo
Index "proc": referring to the processed photo from the virtual camera position.
Coordinates/indices (x,y): the integer position of a pixel in the acquired photo
P: Pixel value, e.g. RGB or another color space.
Coordinates/indices (x',y'): the new (decimal) position of the pixel value of pixel (x,y) after transformation
Coordinates/indices (i,j): the integer position of a pixel in the processed photo The following geometric relations can be derived from FIG. 2:

$$d_{acq}/D = f/D_{acq}$$

$$d_{proc}/D = f/D_{proc}$$

$$d_{proc} = d_{acq} + C$$

$$=> D_{proc}/D_{acq} = d_{acq}/d_{proc}$$

$$=> D_{proc} = D_{acq} * d_{acq}/d_{proc}$$

$$=> D_{proc} = D_{acq} * d_{acq}/(d_{acq} + C) \quad (1)$$

As previously mentioned, the magnification is the ratio between the real size of the object and the object's size in the photo, and can, in relation to FIG. 2, be expressed as $D/D_{acq} = f/d_{acq}$ in the acquired photo and $D/D_{proc} = f/d_{proc} = f/(d_{acq}+C)$ in the processed photo.

The transformation (1) introduces a magnification of the entire image. If we want to choose a reference plane where the magnification factor is one, we need to compute the magnification factor for this distance. This is illustrated in FIG. 3. The reference plane is preferably chosen to be near the center of the object in the direction towards the camera. For e.g. a face, the reference plane can be chosen to be the plane of the contour of the face (hair/ears) so the head size is kept and the nose distortion is fixed.

The magnification at the reference plane is:

$$D_{proc\_ref}/D_{acq\_ref} = (d_{acq\_ref})/(d_{acq\_ref} + C) \quad (2)$$

Including the reference magnification (2) in the transformation (1) one obtains:

$$D_{proc} = D_{acq} * d_{acq} * (d_{acq\_ref} + C)/((d_{acq\_ref}) * (d_{acq} + C)) \quad (3)$$

If C is infinity (same magnification for all objects) we have:

$$D_{proc} = D_{acq} * d_{acq}/(d_{acq\_ref}) \quad (4)$$

Since D has rotational symmetry around the optical axis (z-axis), the transformation as expressed in (3) is in polar coordinates with D as the radial coordinate and angular coordinate φ which is unaffected by the transformation. It should be noted that other expressions for the transformation (3) with the same or similar results may be developed, using e.g. other coordinate systems, other camera optics or other conditions. The important feature in the transformation (3) is that the transformation, and thus the correction, of any pixel in the photo depends on the depth of that pixel, $d_{acq}$. So, given a photo with a perspective distortion and an associated depth map, by selecting a virtual camera position from which the perspective distortion is significantly reduced or absent, the perspective correction is in principle complete.

The transformation (3) can be used to calculate the positions (x',y') of the pixels with values $P_{(x,y)}$ as they would have been if photo had been taken with the camera in the virtual position. As can be inferred from (3), the new position is a function of the pixel's depth $d_{(x,y)}$, its position, D, and the displacement, C, between the virtual camera position and the acquisition position. By including the reference magnification from (2) in (3), the new positions preserves a magnification in a selected plane of the depth map.

In a preferred implementation, the transformation (3) is applied as a forward transformation; from the original pixel position (x,y), compute the new position (x',y') of the pixel value $P_{(x,y)}$. Forward transform involves the complications that multiple pixels can contribute to a single pixel in the processed photo and some pixel in the processed photo may get no contributions at all. An inverse transformation can also be used, but for this perspective correction the computation is more demanding, and forward mapping is the preferred implementation.

In a forward transformation, the acquired photo is scanned, and for each point computes new coordinates. However, in order for the transformed photo to be expressed in standard digital format with a regular array of pixels with the same size and each having a single value in some color space, the transformed photo need some more processing. Just relocating each pixel (x,y) to its new position (x',y') would create a picture with points where more pixels overlap (multiple source pixels) and blank points with no pixels (holes).

For each source pixel P(x,y), with x and y being integer values, coordinates in the processed image: x' and y' are decimal values. These coordinates can be expressed as an addition of an integer value (i,j) and the fractional part $(\delta_x, \delta_y)$.

$$x' = i + \delta_x$$

$$y' = j + \delta_y$$

Figure 4:
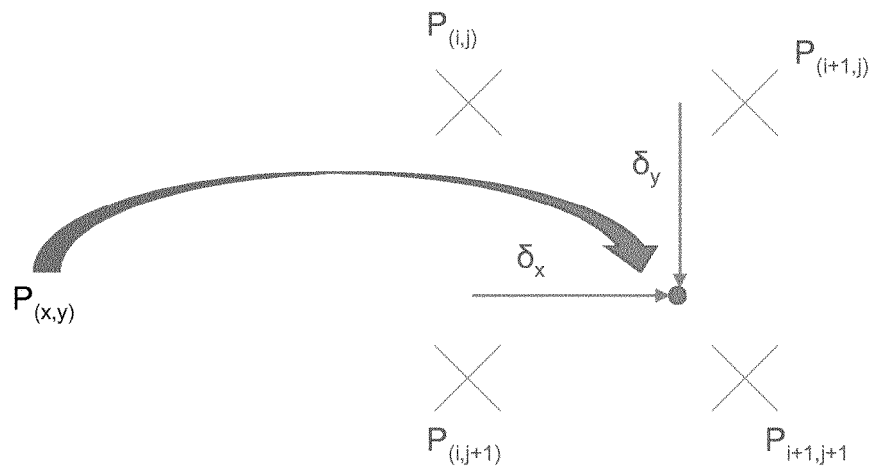
FIG. 4 illustrates the calculation of new pixel values.

First, pixel values $P_{(x,y)}$ are assigned to the pixels in the pixel array of the processed photo, this is described in relation to FIG. 4. The $P_{(x,y)}$'s are the pixel values in the destination photo, and the X's are the centers of the pixels (i,j) in the processed photo with values $P_{(i,j)}$. For every new position calculated, the corresponding pixel value will contribute to the pixel values of the nearby pixels in the processed photo. In a preferred implementation, this is carried out as follows.

The new pixel values are determined by, for each pixel in the acquired photo add the corresponding pixel value $P_{(x,y)}$ to the new pixel values $P_{(i,j)}$ of the four pixels in the corrected photo that are closest to the new position. When added, the pixel values $P_{(x,y)}$ are weighted by a weighting factor that is a function of the relative positions of the new position (x',y') and the pixel (i,j) so that, as illustrated in FIG. 4 for a bilinear interpolation:

$$P_{(i,j)} \rightarrow P_{(i,j)} + P_{(x,y)} * (1-\delta_x) * (1-\delta_y)$$

$$P_{(i+1,j)} \rightarrow P_{(i+1,j)} + P_{(x,y)} * \delta_x * (1-\delta_y)$$

$$P_{(i,j+1)} \rightarrow P_{(i,j+1)} + P_{(x,y)} * (1-\delta_x) * \delta_y$$

$$P_{(i+1,j+1)} \rightarrow P_{(i+1,j+1)} + P_{(x,y)} * \delta_x * \delta_y$$

Thus, weighted values of the original pixel values are accumulated in each pixel in the processed photo. In order to normalize the new pixel values in the processed photo, each pixel value is subsequently divided by a normalization factor.

In actual practice, a "Photo accumulated buffer" is created. First it is filled with 0's, and each time a pixel value $P_{(x,y)}$ contributes to a pixel $P_{(i,j)}$ in the processed photo, a weighted value of $P_{(x,y)}$ is summed in this buffer. At the same time, the weighting factor (e.g.: $(1-\delta_x)*(1-\delta_y)$) is summed in a "Weighting buffer". Once the forward mapping is done, each pixel from the Photo accumulated buffer is divided by the Weighting factor of the "weighting buffer" to generate a "Weighted perspective corrected photo". This solves the problem that with forward mapping, some pixels in the processed photo get information from multiple pixels in the acquired photo.

In the above, accumulating of the acquired pixel values in the surrounding pixels uses a bilinear interpolation and a weighting factor $\delta_x * \delta_y$. However, other ways of distributing the pixel values of the acquired photo and thereby other weighting factors are possible and other interpolation method such as bicubic or spline could also be used.

The weighted perspective corrected photo may contain "holes" where no pixel in the acquired photo has contributed to this pixels value, and it is therefore undefined. To fill the holes, an interpolated pixel value from surrounding pixels in the corrected photo having defined values of $P_{(i,j)}$ is calculated for pixels with undefined values of $P_{(i,j)}$. In a preferred implementation, the weighted perspective corrected photo is scanned, and each time a hole is found, an interpolated value of this pixel is computed, based on Inverse Distance Weighted (IDW) from the valid pixel.

More information related to IDW can be found on e.g. http://en.wikipedia.org/wiki/Inverse_distance_weighting.

Figure 5A:
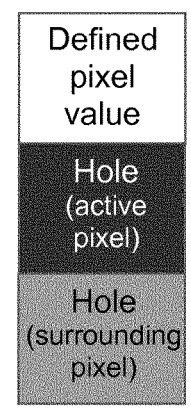
FIGS. 5A-C illustrate the use of adaptive kernels for interpolation pixel values for pixels with undefined pixel values.
Figure 5A:
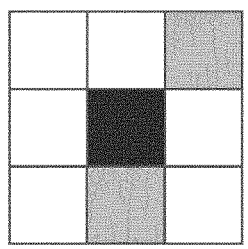
Figure 5B:
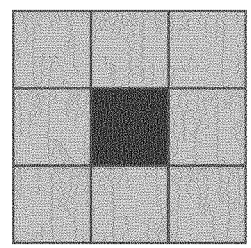
Figure 5C:
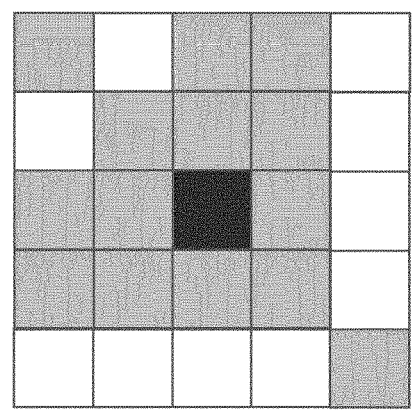

As the size of the holes is unknown, the distance to closest defined pixel value is unknown. In order to ensure fast processing and avoid unfilled holes, adaptive kernel size can be used as illustrated in FIGS. 5A-C: In FIGS. 5A and B, a 3×3 kernel is used, and in 5A, the a value for the active pixel, the hole, can be computed with IDW from the 6 surrounding pixels with defined pixel values. In 5B however, the surrounding pixels do not offer data for IDW, hence no defined value for the active pixel/hole is obtained and the kernel size must be increased, for example to the 5×5 kernel of FIG. 5C. Here, a value for the active pixel/hole can be computed with IDW from the 10 surrounding pixels with defined values.

Filling hole can also be done by texture mapping if the holes are too large for pixel interpolation. For example, for selfies, the side of the nose could be an area where we get missing polygons when the distance is increased, in such a case skin texture mapping can be used.

Figure 6:
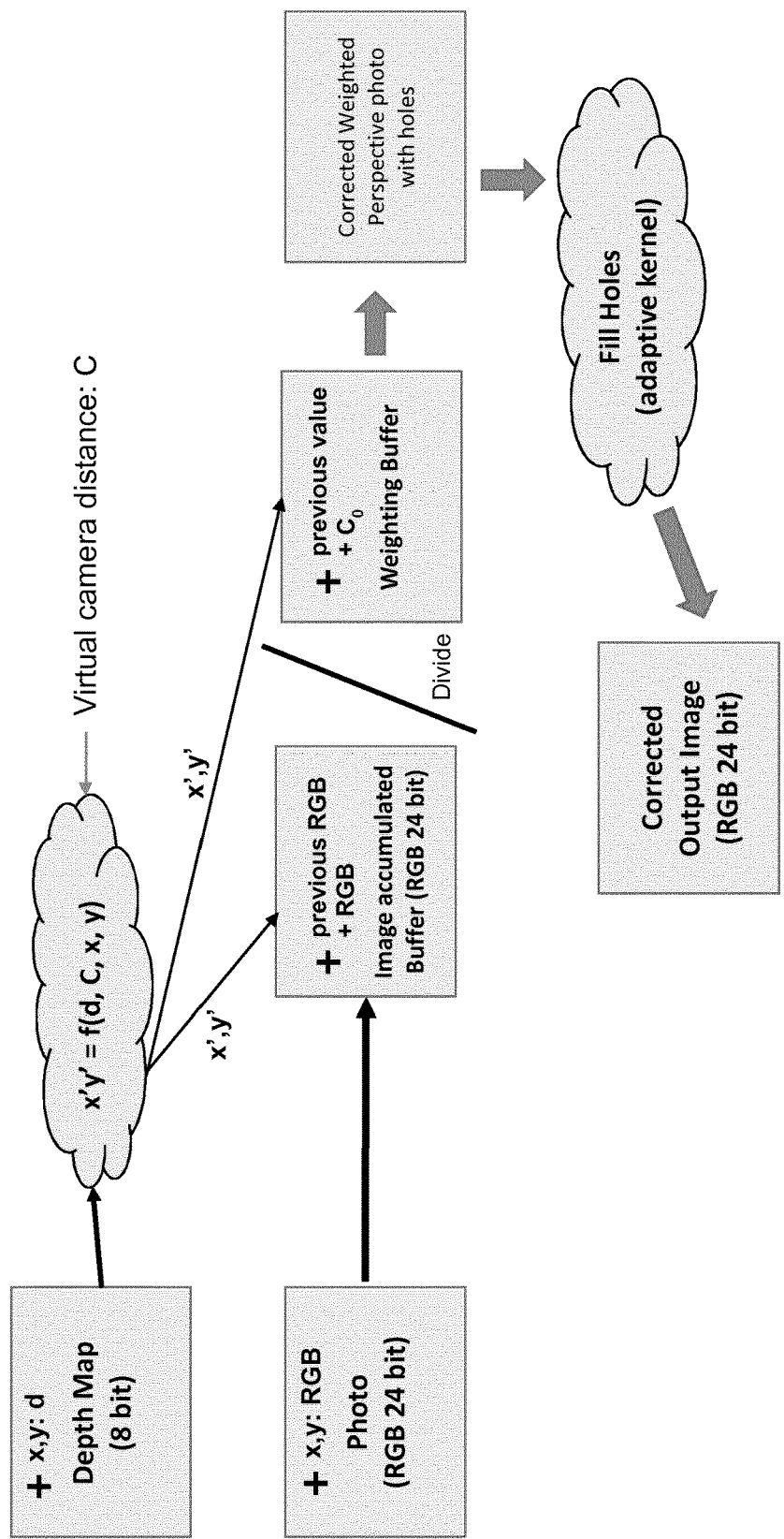
FIG. 6 is a chart illustrating an embodiment of the method according to the invention, as well as a schematic system-chart representing an outline of the operations of the computer program product according to the invention.

FIG. 6 illustrates the full process of the method for perspective correction.

As mentioned previously, the depth map itself, a single channel image with all pixel values being depths, can also be corrected using the same transformations and procedures as for the photo of the scene. The displacement C between the actual and virtual camera positions may be added to each depth/pixel value after the transformation. The corrected depth map is associated with the corrected photo, giving the distances of different parts of the scene to the image plane of the virtual camera position.

Selfie Application

A preferred application of the present invention relates to perspective correction in selfies. Selfies are by nature photos taken at close distance such as using a mobile phone where max distance is typically arm length or a camera in a laptop or tablet computer or a webcam. These close distance photos most often exhibit perspective distortions—face is close to the camera, and the ratio between the distances to the closest part (nose) and furthest part (ear) is significant.

Selfies are therefore typical candidates for automatic perspective correction, and the automatic detection and evaluation of perspective distortion in order to select photos that would benefit from perspective correction mentioned earlier can be combined with pattern recognition to detect depth variation occurring in human faces applied to the depth map.

Also, in case of selfies, the background (part of scene behind the person shooting the selfie) can be determined using the depth map information. Hence, in a preferred embodiment, the method according to the invention involves detection of one or more foreground objects and a background in the photo by analyzing the depth map to identify regions with very fast change in depth and areas being at least partly outlined by such regions, the areas with smaller average depth being identified as foreground objects and areas with larger average depth being identified as background. In an alternative implementation, the method can involve detection of one or more foreground objects and a background in the photo by analyzing the depth map to identify areas with depths smaller than 300 cm, such as smaller than 200 cm, 150 cm, or 100 cm as foreground objects and areas with larger depth being defined as background.

Having detected the background and foreground parts of the photo, the background can be replaced with other image content (photo, painting, graphics or any combination of such) while keeping the foreground objects.

Technical Implementation

The invention can be implemented by means of hardware, software, firmware or any combination of these. The invention or some of the features thereof can also be implemented as software running on one or more data processors and/or digital signal processors. FIG. 6 can also be seen as a schematic system-chart representing an outline of the operations of an embodiment of the computer program product according to the second aspect of the invention. The individual elements of hardware implementation of the invention may be physically, functionally and logically implemented in any suitable way such as in a single unit, in a plurality of units or as part of separate functional units. The invention may be implemented in a single unit, or be both physically and functionally distributed between different units and processors.

The integrated circuit according to the third aspect of the invention can be a general In-System Program (ISP), microprocessor or an ASIC or part of such. This is can be advantageous in particular for the handheld or portable device with a camera according to the fourth aspect of the invention, where low costs, power consumption, weight, volume, heat generation, etc. are of high importance. Handheld devices with camera comprises digital cameras, cellular phones, tablet computers, mp3 players and others. Portable devices with camera comprises for example laptop computers.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for automatically performing perspective correction in a digital photo of a scene recorded with a camera, the method comprising:
   providing, using only a single camera with a single acquisition position,
   a digital photo of a scene represented by pixel values, $P_{(x,y)}$, for an array of pixels, (x,y), the photo having perspective distortion effects;
   a depth map associated with the photo and comprising, for each pixel in the pixel array, a depth, $d_{(x,y)}$, being a distance between a part of the scene represented by that pixel and an acquisition position of the camera at the time of acquisition of the photo; and
   performing perspective correction of the photo using as photographic input only the photo of the scene from the single camera and acquisition position and its associated depth map by, for each pixel, (x,y), in the photo, determining a new position, $D_{proc}$, in an image plane for a virtual camera position from at least the pixel's depth, $d_{acq}(x,y)$, its position, $D_{acq}(x,y)$, in the image plane at the acquisition position, and a displacement, C, between the virtual camera position and the acquisition position as:

$$D_{proc} = \frac{D_{acq}(x,y) * d_{acq}(x,y)}{d_{acq}(x,y) + C}.$$

2. The method according to claim 1, wherein the step of performing perspective correction further comprises adjusting a magnification of the new position using also a depth, $d_{acq\_ref}$, of a reference plane chosen to preserve a magnification in a selected plane of the depth map.

3. The method according to claim 2, wherein the step of performing perspective correction comprises determining the new position as:

$$D_{proc} = \frac{D_{acq}(x,y) * d_{acq}(x,y) * (d_{acq\_ref} + C)}{(d_{acq}(x,y) + C) * d_{acq\_ref}}.$$

4. The method according to claim 1, wherein the step of performing a perspective correction further comprises using the pixel values $P_{(x,y)}$, and the new positions (x',y') to determine new pixel values, $P_{(i,j)}$, for an array of pixels, (i,j), representing a corrected photo by, for each new position (x',y'), adding the corresponding pixel value $P_{(x,y)}$, to the new pixel values $P_{(i,j)}$ of the pixels (I,j) surrounding the new position, wherein the pixel values $P_{(x,y)}$ are weighted by a weighting factor that is a function of the relative positions of the new position (x',y') and each pixel (i,j).

5. The method according to claim 4, further comprising subsequently dividing each new pixel value $P_{(i,j)}$ with a normalization factor.

6. The method according to claim 4, further comprising subsequently, for a new pixel with undefined values of $P_{(i,j)}$, calculating an interpolated pixel value from surrounding pixels in the corrected photo having defined values of $P_{(i,j)}$.

7. The method according to claim 1, wherein the displacement between the virtual camera position and the acquisition position is a linear displacement along an optical axis of the camera.

8. The method according to claim 1, wherein the steps of providing a photo and providing a depth map comprise providing a series of photos and associated depth maps, and wherein the method further comprises detecting and evaluating perspective distortion in the photos based either on the distance of the closest object in the scene or on the analysis of vanishing lines, selecting photos with perspective distortion that would benefit from perspective correction, and automatically performing perspective correction on the selected photos.

9. The method according to claim 1, further comprising performing perspective correction of the depth map by, for each pixel, (x,y), in the depth map, and determining a new position, $D_{proc}$, in an image plane for a virtual camera position from at least the depth held by that pixel, $d_{acq}(x,y)$, its position, $D_{acq}(x,y)$, in the image plane at the acquisition position, and a displacement, C, between the virtual camera position and the acquisition position.

10. A digital storage holding software configured to perform the method of claim 1 when executed by one or more digital processing units.

11. An integrated circuit configured to perform the method of claim 1.

12. A handheld or portable device with a camera comprising the digital storage holding software according to claim 10.

* * * * *